(12) United States Patent
Chen et al.

(10) Patent No.: US 11,697,727 B2
(45) Date of Patent: Jul. 11, 2023

(54) SILICA COATED STARCH

(71) Applicant: THE GOODYEAR TIRE & RUBBER COMPANY, Akron, OH (US)

(72) Inventors: Yusheng Chen, Findlay, OH (US); Abdul Awal, Findlay, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 312 days.

(21) Appl. No.: 17/112,085

(22) Filed: Dec. 4, 2020

(65) Prior Publication Data
US 2021/0179816 A1    Jun. 17, 2021

Related U.S. Application Data

(60) Provisional application No. 62/948,376, filed on Dec. 16, 2019.

(51) Int. Cl.
*C08L 3/02*     (2006.01)
*C08K 9/02*     (2006.01)
(Continued)

(52) U.S. Cl.
CPC .............. *C08L 3/02* (2013.01); *B60C 1/0025* (2013.01); *C08K 9/02* (2013.01); *C08L 21/00* (2013.01)

(58) Field of Classification Search
CPC .................................... C08K 9/02; C08L 3/02
See application file for complete search history.

(56) References Cited

U.S. PATENT DOCUMENTS 4,451,387 A * 5/1984 Tai ..................... C11D 17/0039
510/351
5,672,639 A    9/1997 Corvasce et al.
(Continued)

FOREIGN PATENT DOCUMENTS

CN    102949971 A    3/2013
EP       0995775 B1    8/2004
(Continued)

OTHER PUBLICATIONS

Goncalves et al., Superhydrophobic cellulose nanocomposites, Journal of Colloid and Interface Science 324 (1-2):42-6, Sep. 2008, Cellulose modification with silica particles (Cellulose/silica/PDDA), https://www.researchgate.net/PUBLICATION/5343001_SUPERHYDROPHOBIC_CELLULOSE_NANOCOMPOSITES.

(Continued)

*Primary Examiner* — Vickey Nerangis
(74) *Attorney, Agent, or Firm* — Mandy B. Willis

(57) ABSTRACT

A modified starch product includes a quantity of particles, each having a starch core with an intermediate polymer coating and an exterior coating of a nano-silica. A method for manufacturing a modified starch product including admixing to a silicate and water to form a nano-silica solution; admixing an original starch and a polymer to form particles with a starch core having an intermediate polymer layer; admixing the nano-silica solution and the starch particles having an intermediate polymer layer to form a suspension of the modified starch product; dewatering the suspension of the modified starch product; and drying the modified starch product to form the modified starch having particles including the starch core with the intermediate polymer coating and the exterior coating of a nano-silica. A rubber formulation includes a quantity of elastomer and a (Continued)

quantity of the modified starch. The particles are substantially evenly distributed throughout the elastomer.

14 Claims, 11 Drawing Sheets

(51) Int. Cl.
*B60C 1/00* (2006.01)
*C08L 21/00* (2006.01)

(56) References Cited

U.S. PATENT DOCUMENTS

| | | | |
|---|---|---|---|
| 5,827,398 A | 10/1998 | Depasquale et al. | |
| 6,080,805 A | 6/2000 | Kaufman | |
| 6,083,586 A | 7/2000 | Andersen et al. | |
| 6,136,772 A | 10/2000 | De et al. | |
| 6,231,970 B1 | 5/2001 | Andersen et al. | |
| 6,269,858 B1 | 8/2001 | Sandstrom | |
| 6,390,164 B1 | 5/2002 | Beers | |
| 6,391,945 B2 | 5/2002 | Sandstrom | |
| 6,458,871 B2 | 10/2002 | Materne et al. | |
| 6,482,884 B1 | 11/2002 | Schaal et al. | |
| 6,539,996 B1* | 4/2003 | Corvasce | C08L 9/00 152/557 |
| 6,541,113 B1 | 4/2003 | Mehos et al. | |
| 6,548,578 B2 | 4/2003 | Pawlikowski | |
| 6,746,542 B1 | 6/2004 | Lorencak et al. | |
| 6,838,511 B2 | 1/2005 | Zanzig | |
| 6,848,487 B2 | 2/2005 | Weydert et al. | |
| 6,878,760 B2 | 4/2005 | Corvasce et al. | |
| 10,030,127 B2 | 7/2018 | Balnis | |
| 2003/0069332 A1 | 4/2003 | Agostini et al. | |
| 2003/0073774 A1 | 4/2003 | Zanzig | |
| 2003/0092801 A1 | 5/2003 | Agostini et al. | |
| 2004/0019135 A1 | 1/2004 | Horiguchi et al. | |
| 2004/0024093 A1 | 2/2004 | Weydert et al. | |
| 2005/0056356 A1* | 3/2005 | Lechtenbohmer | B60C 11/0311 152/209.1 |
| 2005/0145312 A1 | 7/2005 | Herberger, Sr. et al. | |
| 2006/0100338 A1 | 5/2006 | Andersson et al. | |
| 2007/0246179 A1 | 10/2007 | Silenius et al. | |
| 2009/0107360 A1 | 4/2009 | Anderson et al. | |
| 2009/0283186 A1 | 11/2009 | Kaszas | |
| 2013/0079441 A1 | 3/2013 | Kim et al. | |
| 2014/0228493 A1 | 8/2014 | Wallen | |
| 2018/0105681 A1 | 4/2018 | Pille-wolf et al. | |

FOREIGN PATENT DOCUMENTS

| | | |
|---|---|---|
| JP | H10130621 A | 5/1998 |
| WO | 1997039116 A1 | 10/1997 |
| WO | 2008/037578 A1 | 4/2008 |

OTHER PUBLICATIONS

Yang et al. "Dry particle coating for improving the flowability of cohesive powders", Powder Technology, vol. 158, Issues 1?3, 2005, pp. 21-33, ISSN 0032-5910, [Retrived on Feb. 2, 2021] Retrived from the Internet <URL:https://doi.org/10.1016/j.powtec.2005.04.032>.

Office Action for Chinese Application 202080087401.3. dated Feb. 11, 2023.

Lee, Dam-Hee et al, Comparison on Mechanical Properties of SSBR Composites Reinforced by Modified Carbon black Silica and Starch, Comparison on Mechanical Properties of SSBR Composites Reinforced by Modified Carbon black Silica and Starch, Nov. 27, 2018, 175-180, vol. 53, No. 3, Elastomers and Composites.

Vikman, K et al, Water Fastness of Ink Jet Prints on Modified Conventional Coatings, Water Fastness of Ink Jet Prints on Modified Conventional Coatings, Mar. 1, 2004,138-147, vol. 48, No. 2, Journal of Imaging Science and Technology, Espoo, FI.

* cited by examiner

Design of silica-starch:

SILICA COATED STARCH

CROSS-REFERENCE TO RELATED APPLICATIONS

This application claims the benefit of U.S. Provisional Application No. 62/948,376 filed on Dec. 16, 2019. The entire disclosure of the above application is incorporated herein by reference.

FIELD

The present disclosure relates to reinforcing fillers for rubber compounds and, more particularly, to a modified starch filler for rubber compounds.

BACKGROUND

This section provides background information related to the present disclosure which is not necessarily prior art.

Starch is a carbohydrate consisting of a large number of glucose units joined by glycosidic bonds. Starch has many advantages such as low cost, abundant supply, and environmental amity. It is widely known for use in food, papermaking, fine chemicals, and the packing material industry. Starch is also a renewable material, which can reduce dependency on petroleum based materials.

The application of starch as a rubber filler has drawn increased interest from the rubber industry in recent years. The use of starch with carbon black and silica in tires, in particular, can provide a number of improved properties such as reduced tire weight, decreased rolling resistance, and increased wet grip accompanied with maintained abrasion resistance. The application of starch is also attractive due to energy consumption and environmental pollution concerns with conventional tires.

With anticipated low cost, light weight, and good comprehensive performance, starch and rubber composites can be applied not only in rubber tires, but also in other kinds of rubber products. For these reasons, extensive efforts are being applied to develop starch-based composites, including, for example, starch bio-composites and starch-based thermoplastics obtained by blending starch with synthetic polymer to replace one or more synthetic polymer materials or their composites.

Starch particles are comparatively large (1-20 µm), however, and likewise have a lower surface area relative to traditional rubber fillers like carbon black and silica. Further, starch is polar and exhibits generally reduced interactions with hydrophobic or non-polar rubbers, such as styrene-butadiene rubber (SBR) and natural rubber (NR), in comparison to carbon black. Due to the lower surface area and the polar surface, the interaction between starch and hydrophobic polymers is poor. Such starch particles can, therefore, be non-reinforcing when used as filler in most rubber composites. As a result, the starch based rubber composites do not provide the requisite mechanical properties for many applications, including tires.

There is a continuing need for a modified starch product that can be utilized in rubber compositions as a reinforcing filler in rubber compositions. Desirably, the modified starch product can provide improved performance in the rubber compositions, where compared to an unmodified starch.

SUMMARY

In concordance with the instant disclosure, a modified starch product that can be utilized in rubber compositions as a reinforcing filler in rubber compositions, and which can provide improved performance in the rubber compositions, where compared to an unmodified starch, has been surprisingly discovered.

It has been found that the hydroxyl group on the starch particle surface exhibits a strong polarity and interaction with neighboring starch particles through hydrogen bonds. Due to the interaction between starch particles, there is a tendency of starch to aggregate, which can lead to poor filler dispersion in rubber compounds. Thus, shielding the hydroxyl group on the starch surface, thereby making the starch particles less hydrophilic and more hydrophobic, can minimize starch aggregation and achieve better filler dispersion in rubber compounds.

In certain embodiments, a modified starch product includes particles having a starch core, an intermediate polymer coating, and an exterior coating of a nano-silica. The starch core can provide a supporting cross-base as the reinforcing filler structure. The intermediate polymer layer blocks the hydrophilic hydroxyl groups on the surface of the silica core to decrease filler-filler interaction. The intermediate polymer layer further creates a polymer buffer for energy dissipation. The exterior coating of the nano-silica creates a shell to increase the surface area and accessibility of the modified starch product to react with silane.

In other embodiments, a method for manufacturing a modified starch product involves coating of nano-silica onto a starch surface by an irreversible adsorption process. A silicate and water are admixed to form a nano-silica solution; admixing an original starch and a polymer to form particles with a starch core having an intermediate polymer layer. The nano-silica solution and the starch particles having an intermediate polymer layer are admixed to form a suspension of the modified starch product. The suspension of the modified starch product can be dewatered. The modified starch product can then be dried to form the modified starch having particles including the starch core with the intermediate polymer coating and the exterior coating of a nano-silica.

In a further embodiment, a rubber formulation includes a quantity of elastomer and a quantity of a modified starch particles, each of the particles including a starch core with an intermediate polymer coating and an exterior coating of a nano-silica. The particles can be substantially evenly distributed throughout the elastomer.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3:
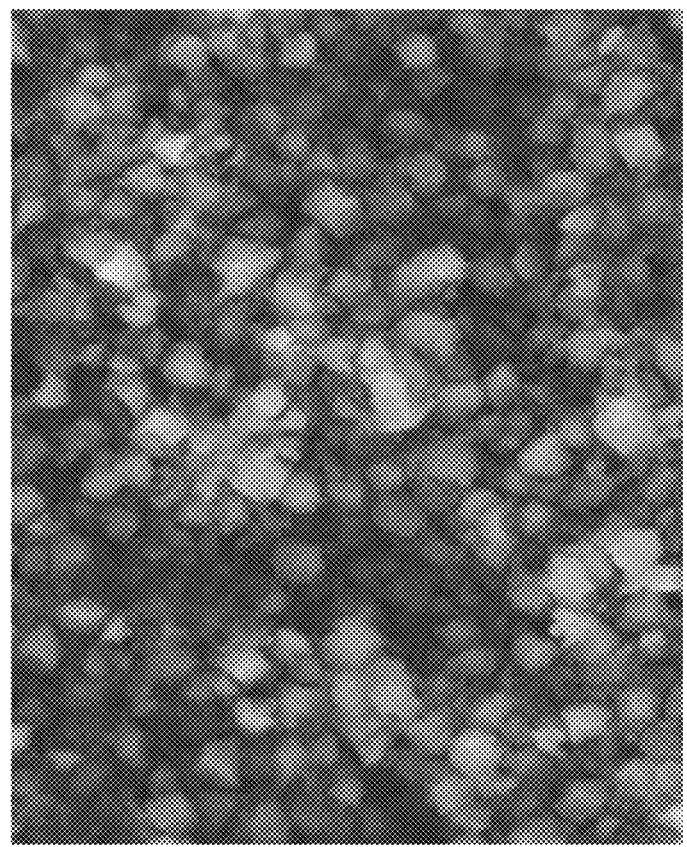
Figure 3:
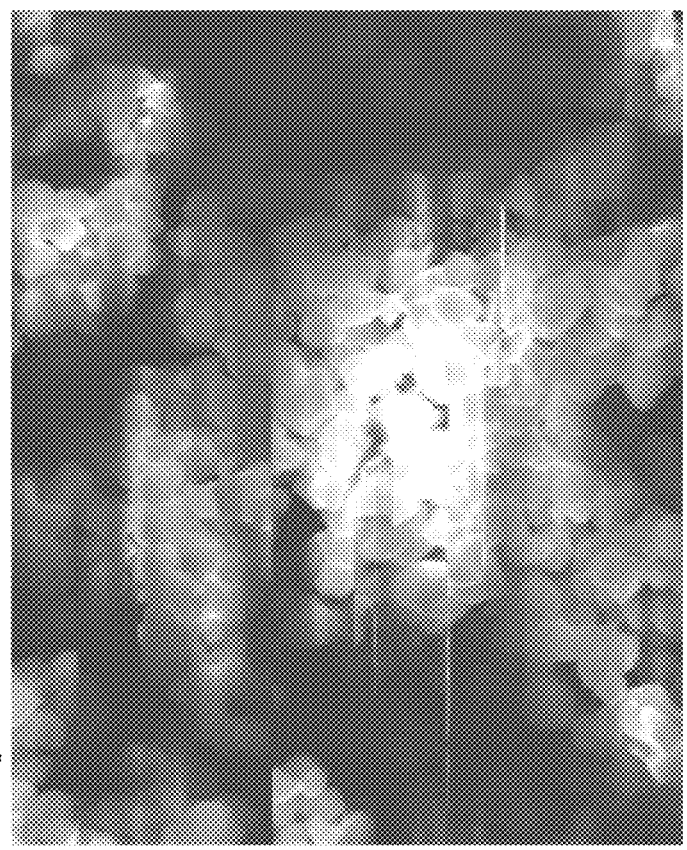
Figure 4:
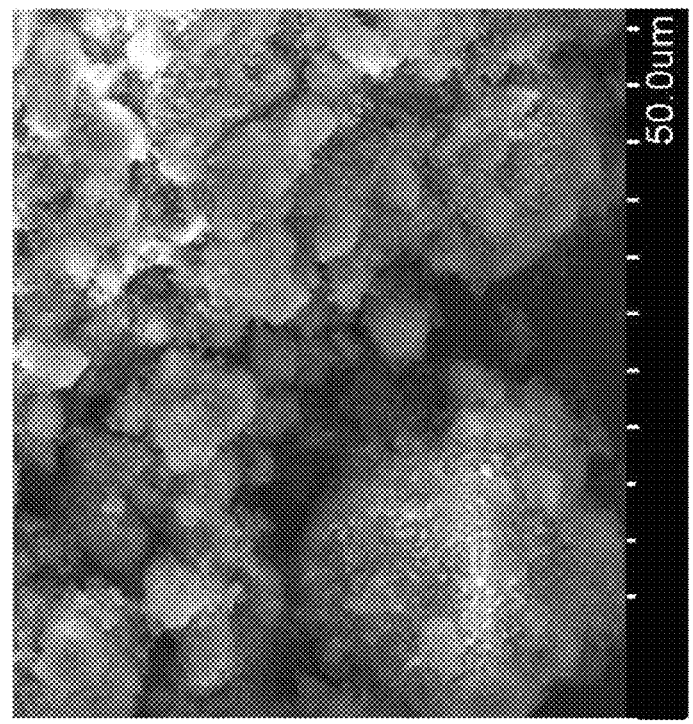
Figure 4:
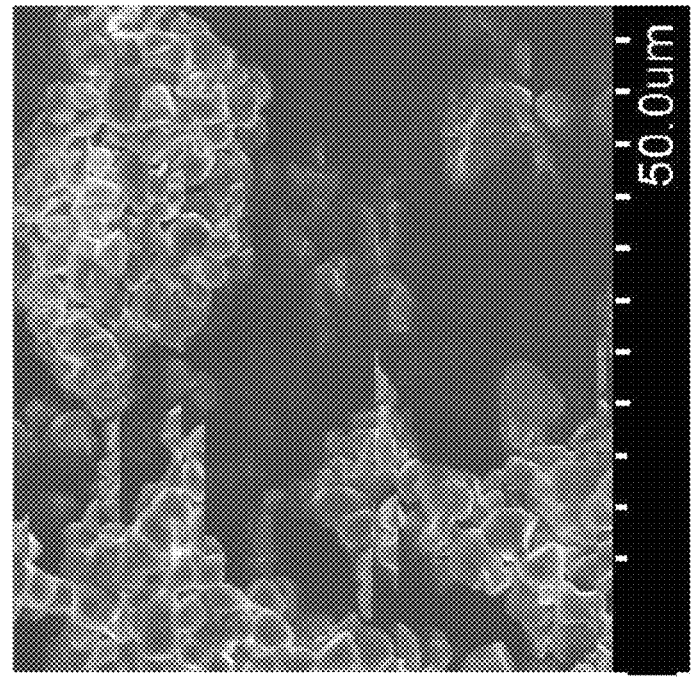
Figure 5:
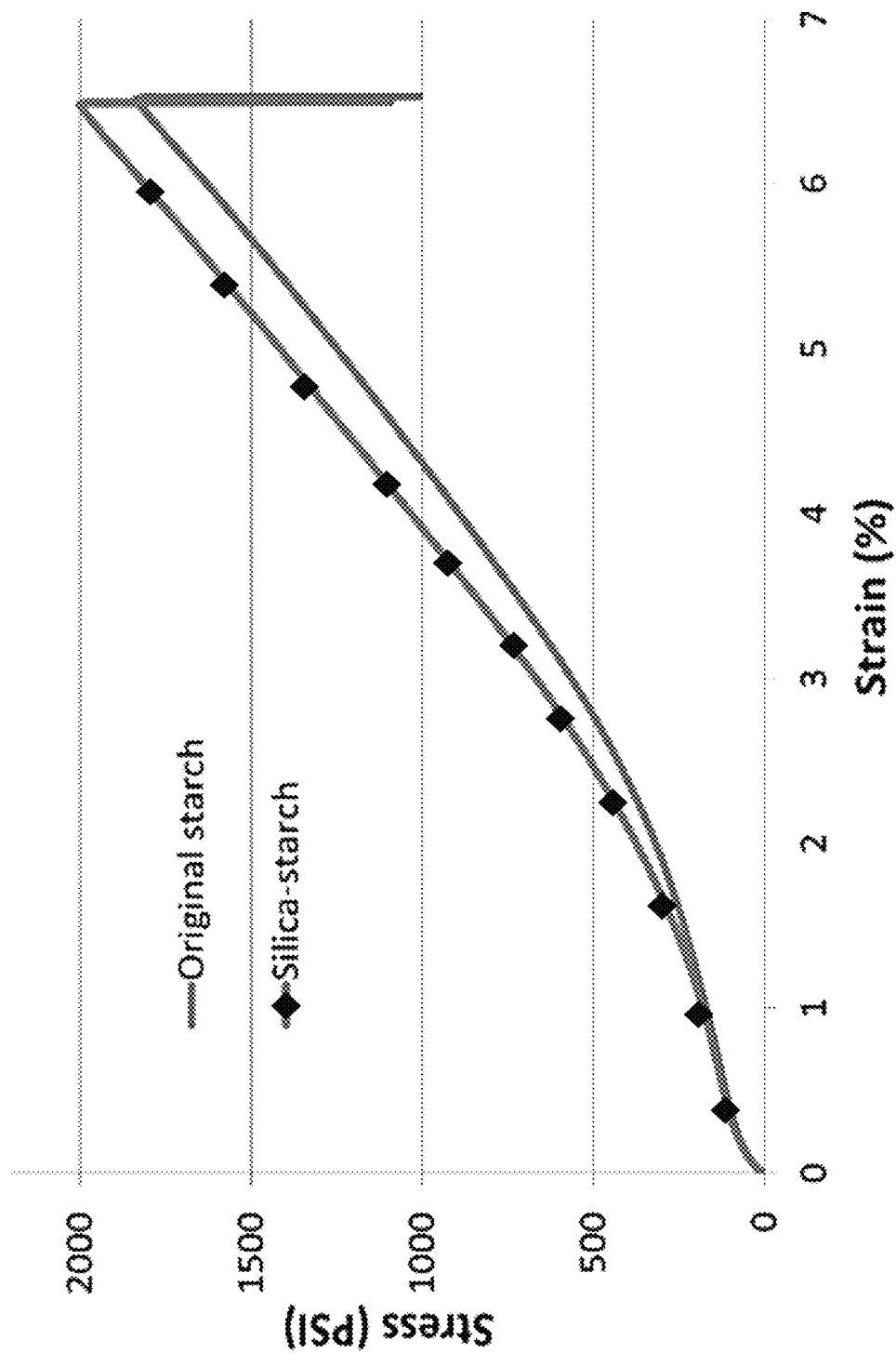
Figure 6:
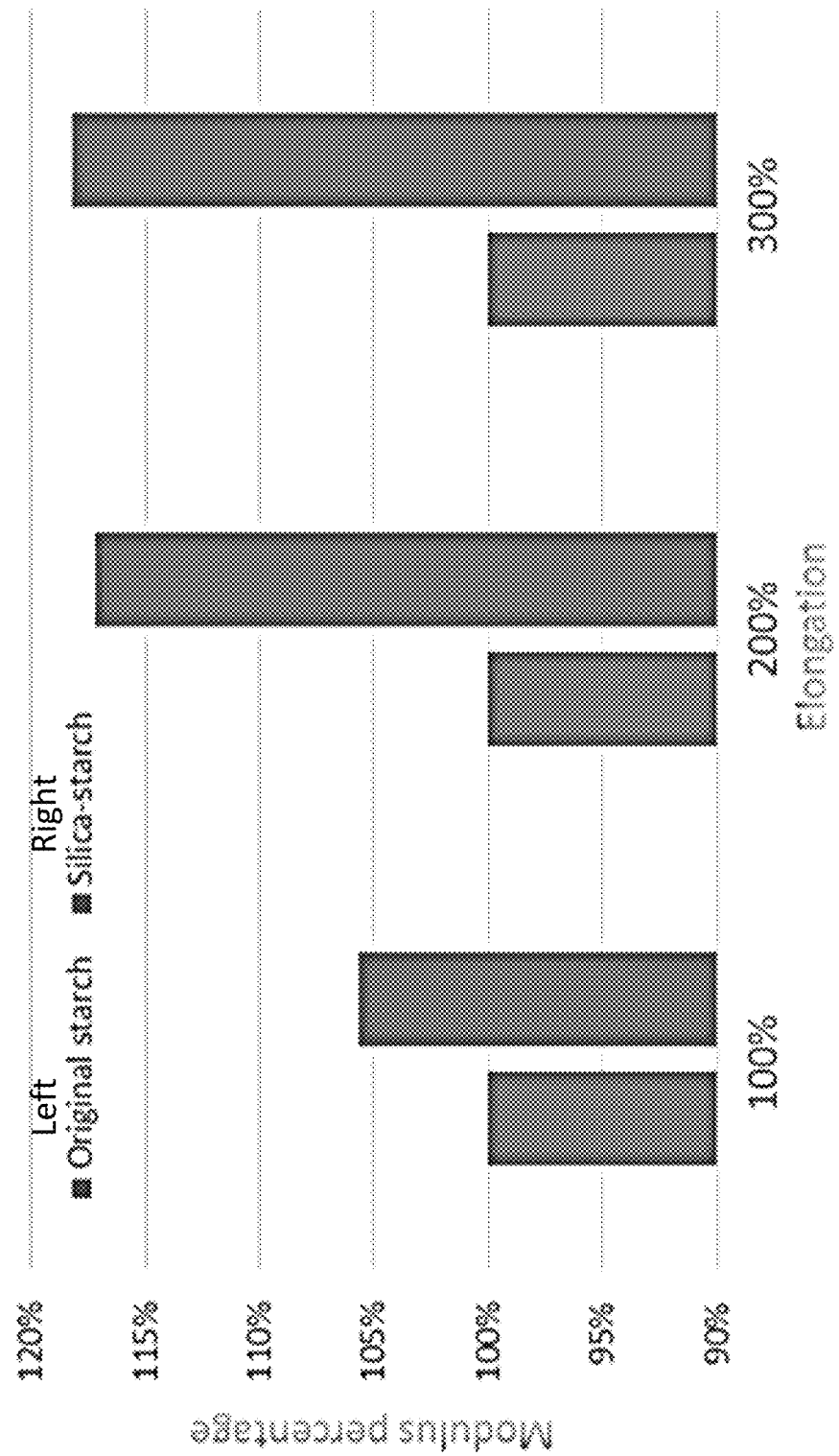
Figure 7:
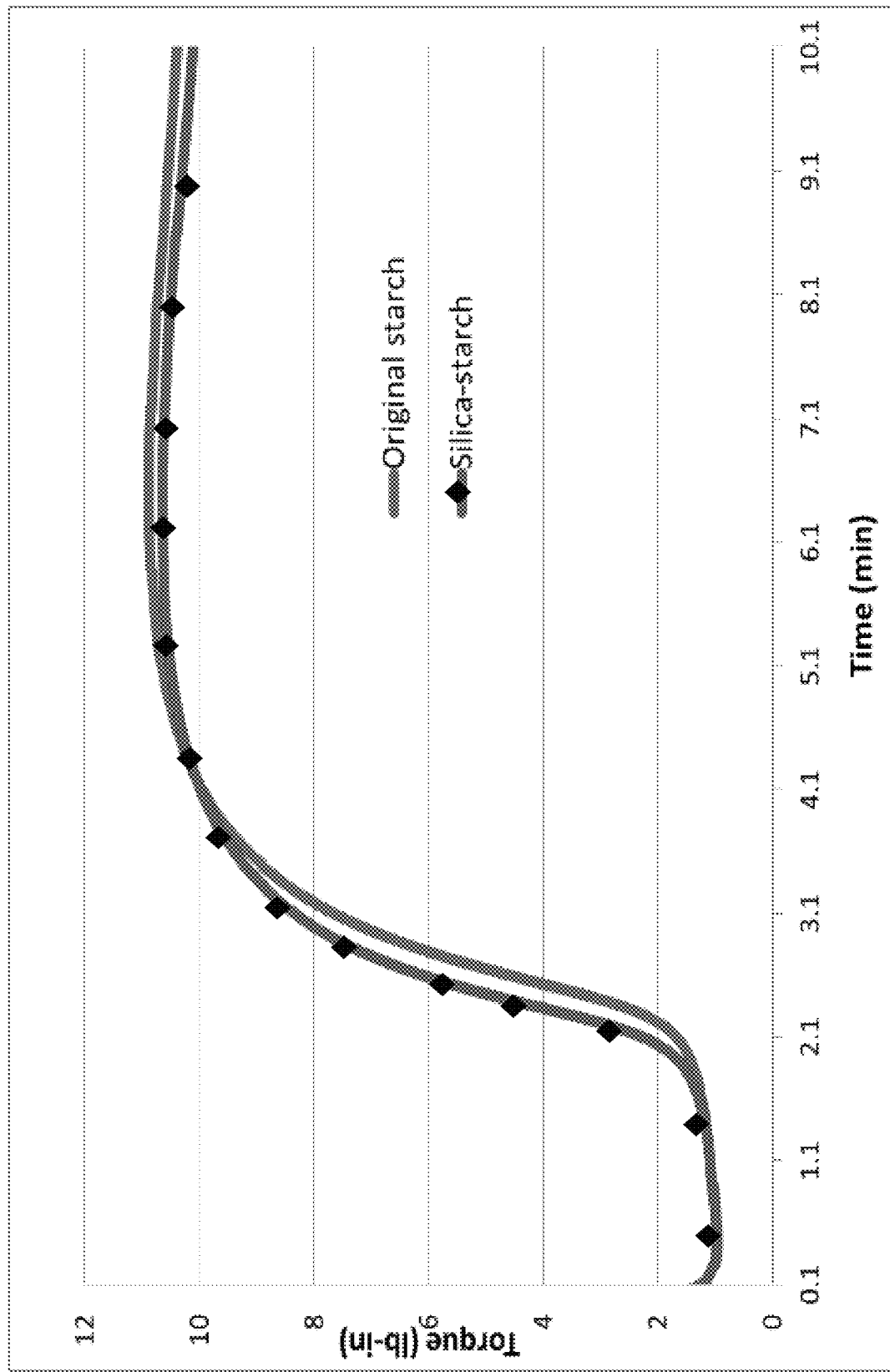
Figure 8:
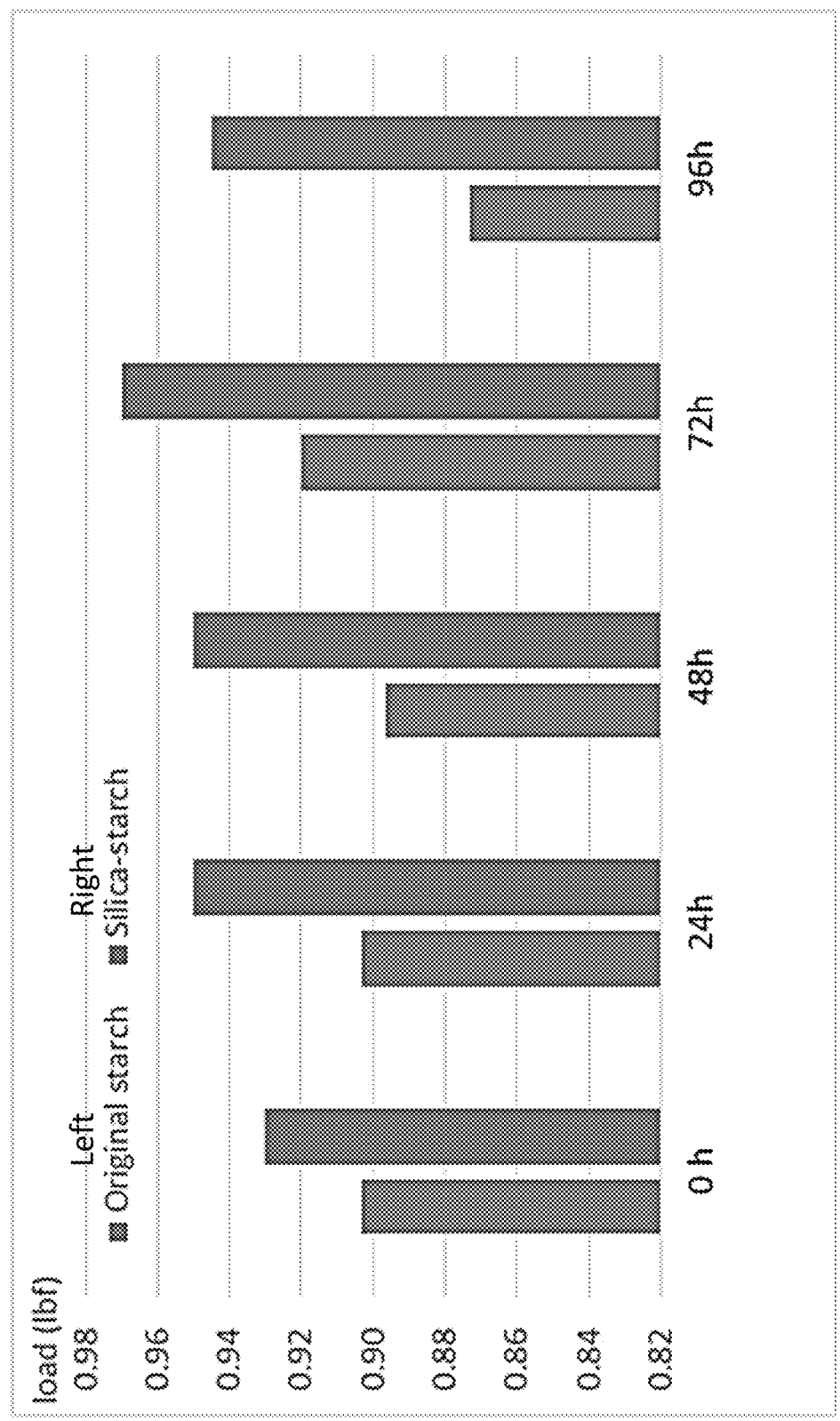
Figure 9:
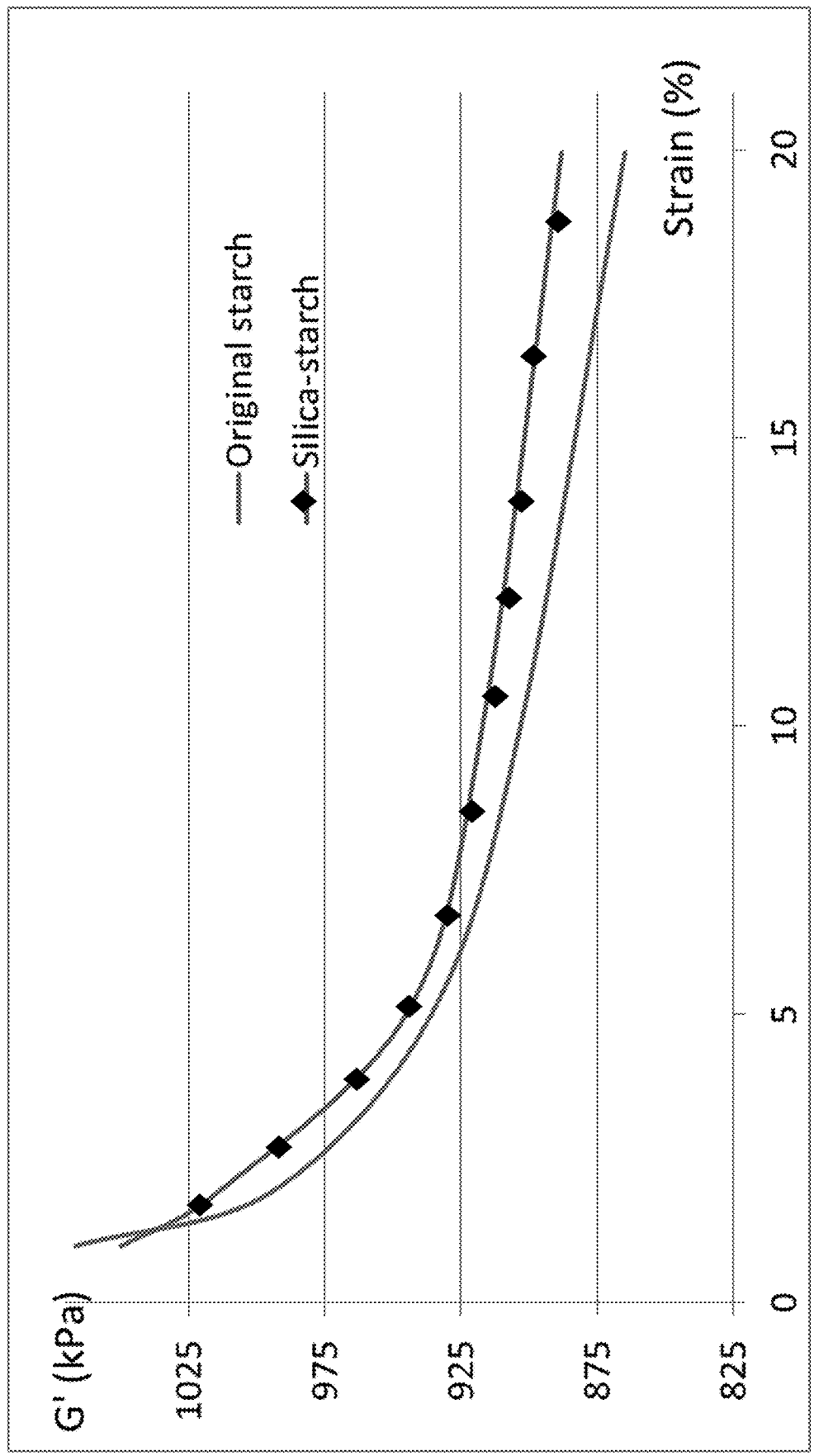
Figure 10:
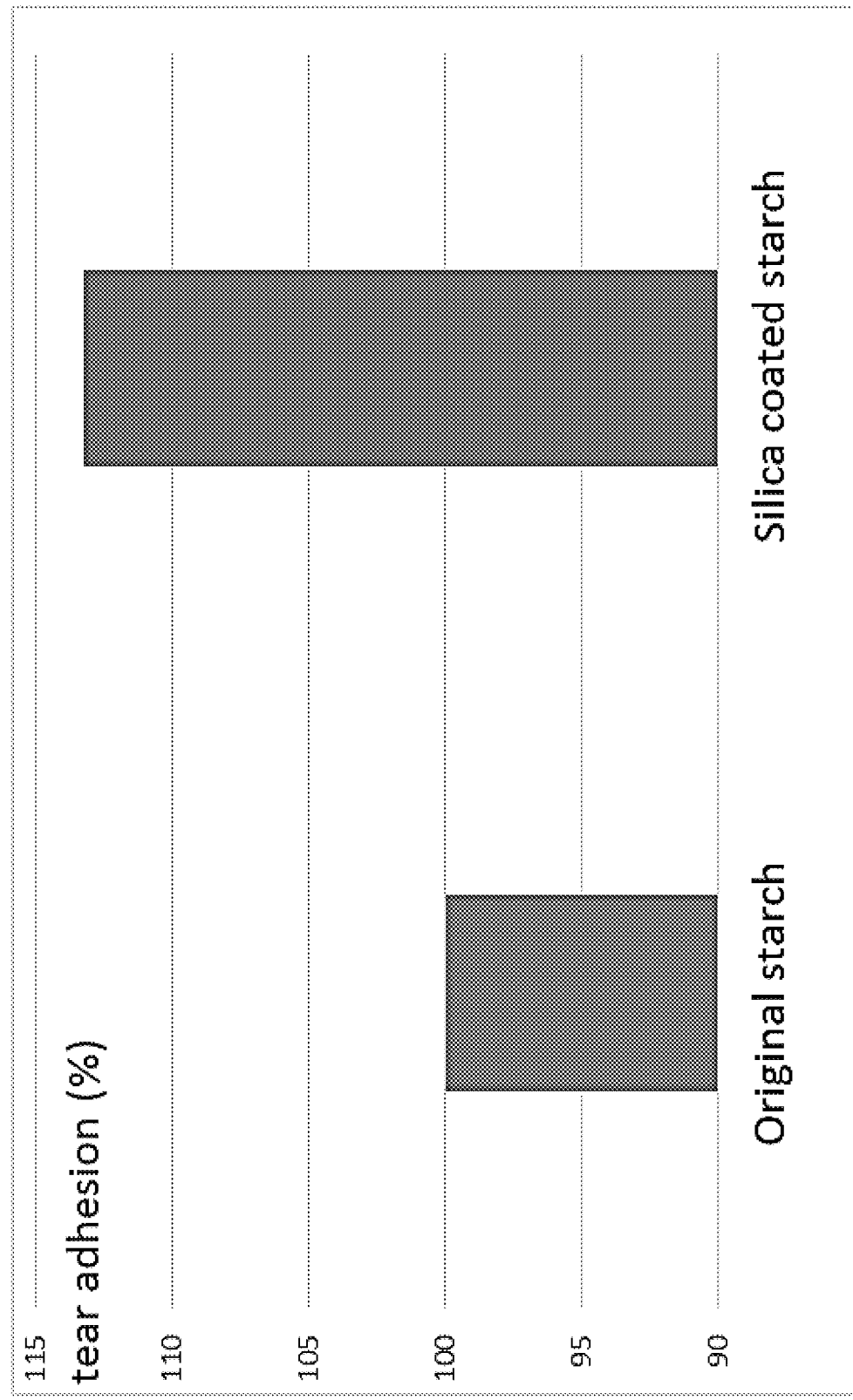

FIG. 3 includes images comparing an original starch and the modified starch product, each image taken from a scanning electron microscope, having a width of 40 micrometers, and showing a reduced aggregation of the modified starch product relative to the original starch;

FIG. 4 includes images comparing an original starch and the modified starch product, each image taken from a scanning electron microscope, and depicting a difference in surface morphology including a greater surface roughness of the modified starch product relative to the original starch;

FIG. 5 is a graph comparing tensile properties of rubber compositions compounded with the original starch and the modified starch product;

FIG. 6 is a graph comparing a modulus of rubber compositions compounded with the original starch and the modified starch product;

FIG. 7 is a graph comparing cure curves of rubber compositions compounded with the original starch and the modified starch product;

FIG. 8 is a graph comparing ozone degradation properties of rubber compositions compounded with the original starch and the modified starch product;

FIG. 9 is a graph comparing Payne effects of rubber compositions compounded with the original starch and the modified starch product; and FIG. 10 is a graph comparing tear adhesion properties of the rubber compositions compounded with original starch and the modified starch product.

DETAILED DESCRIPTION

The following description of technology is merely exemplary in nature of the subject matter, manufacture and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

All documents, including patents, patent applications, and scientific literature cited in this detailed description are incorporated herein by reference, unless otherwise expressly indicated. Where any conflict or ambiguity can exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that can be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it can be directly on, engaged, connected or coupled to the other element or layer, or intervening elements or layers can be present. In contrast, when an element is referred to as being "directly on," "directly engaged to," "directly connected to" or "directly coupled to" another element or layer, there can be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
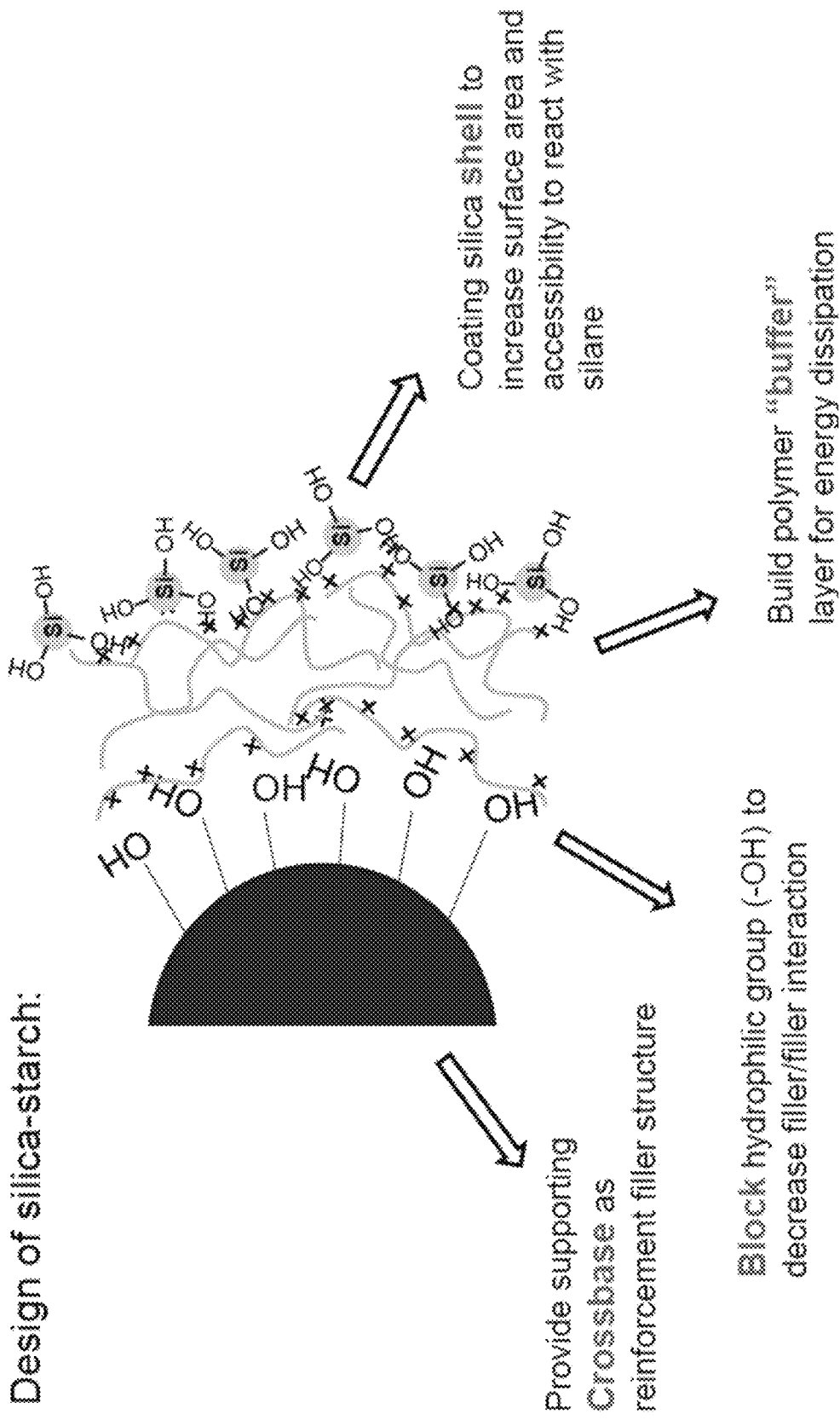
FIG. 1 is a schematic view of a modified starch product depicting a starch core, an intermediate polymer coating, and an exterior nano-silica coating, according to one embodiment of the present disclosure.

The present disclosure relates to a modified starch product, for example, as shown in FIG. 1. The modified starch product can include discrete particles, which can be finely divided or aggregated. The starch particles can be configured to be incorporated or compounded into a rubber composition. Each particle can have a starch core with an intermediate polymer coating and an exterior coating of a nano-silica. As a non-limiting example, the modified starch product can be configured to be used as a reinforcing filler in a rubber composition for a tire. A skilled artisan can select further suitable end uses for the modified starch product, as desired.

The particles of the modified starch product can have a particle size of about one micron (1 µm) to about ten microns (10 µm). More particularly, the particles of the modified starch product can have a particle size of about two microns (2 µm) to about eight microns (8 µm). Most particularly, the particles of the modified starch product can have a particle size of about three microns (3 µm) to about seven microns (7 µm). One of ordinary skill in the art can select other suitable dimensions for the modified starch product within the scope of the present disclosure.

The starch core can be formed from particles of an original starch. The particles of the original starch can have a particle size configured to allow the modified starch product to be used in the rubber composition. The original starch can have a particle size from about one micron (1 µm) to about twenty microns (20 µm), for example. The original starch can be an unmodified starch. The original starch can be one or more of a rice starch, a corn starch, a potato starch and a wheat starch, as non-limiting examples. In a most particular embodiment, the original starch is rice starch. A skilled artisan can employ other suitable original starches for the fabrication of the starch core of the modified starch product, as desired.

It should be appreciated the starch core can have a plurality of hydroxyl groups on the surface thereof. Where the original starch is unmodified, the hydroxyl groups of a first starch core can undesirably interact with the hydroxyl groups of a second starch core via the formation of hydrogen bonds between the starch cores. The hydrogen bonds can lead to the undesirable aggregation of the starch cores defined by the original starch.

In order to minimize the formation of hydrogen bonding between the starch cores, the intermediate polymer coating is employed. In particular, the intermediate polymer coating of the starch core can be configured to interact with or otherwise coat the hydroxyl groups of the starch cores. In other words, the intermediate polymer coating can be adapted to militate against the formation of hydrogen bonds between the starch cores.

The intermediate polymer coating can also be selected so as to be sufficiently reactive to interact with the nano-silica of the exterior coating. The intermediate polymer layer can also improve the energy dissipation of the modified starch particles. In a most particular example, the intermediate polymer coating can be poly(diallyldimethylammonium chloride) (PDDA). Advantageously, PDDA has a large charge density. The large charge density can allow the PDDA to concurrently interact with the hydroxyl groups of the starch cores and the nano-silica of the exterior coating. Further, the intermediate polymer layer can serve as a damping layer due to viscoelastic properties of PDDA. Although PDDA has been found to be especially advantageous, a skilled artisan can also select other suitable materials with a sufficiently high charge density for the intermediate polymer coating, as desired.

The exterior coating of the nano-silica is disposed on the intermediate polymer coating of the modified starch product, and encapsulates both the starch core and the intermediate polymer coating. Nano-silica can have a hardness that is particularly suited for use in filler compounds, which can improve the reinforcing effect of the filler compounds. The exterior coating of nano-silica provides a silanol group on the exterior coating of the modified starch product. The silanol group can increase interactions between the modified starch product and rubber polymers of the rubber compositions.

As a non-limiting example, the exterior coating of nano-silica can be formed from tetra-ethyl orthosilicate (TEOS). The aggregated nano-silica can have an average diameter of between about 500 nm and about 800 nm, for example. One of ordinary skill in the art can also select other suitable types and dimensions for the nano-silica within the scope of the present disclosure.

With reference to FIGS. 3-4, a scanning electron microscope was used to image the particles of original starch and the particles of the modified starch product. As shown in FIG. 3, the aggregation of the original starch and the modified starch product are shown, where it can be seen that the modified starch product exhibits a reduced amount of particle aggregation compared to the original starch. Addition of the intermediate polymer coating and the exterior coating of nano-silica militates against the structure of the original starch aggregate. As shown in FIG. 4, the exterior coating of nano-silica can have an increased surface area compared to the surface area of the original starch. Accordingly, the exterior coating of nano-silica provides an increased accessibility to react of the particles of the modified starch product with the rubber polymers.

Figure 2A:
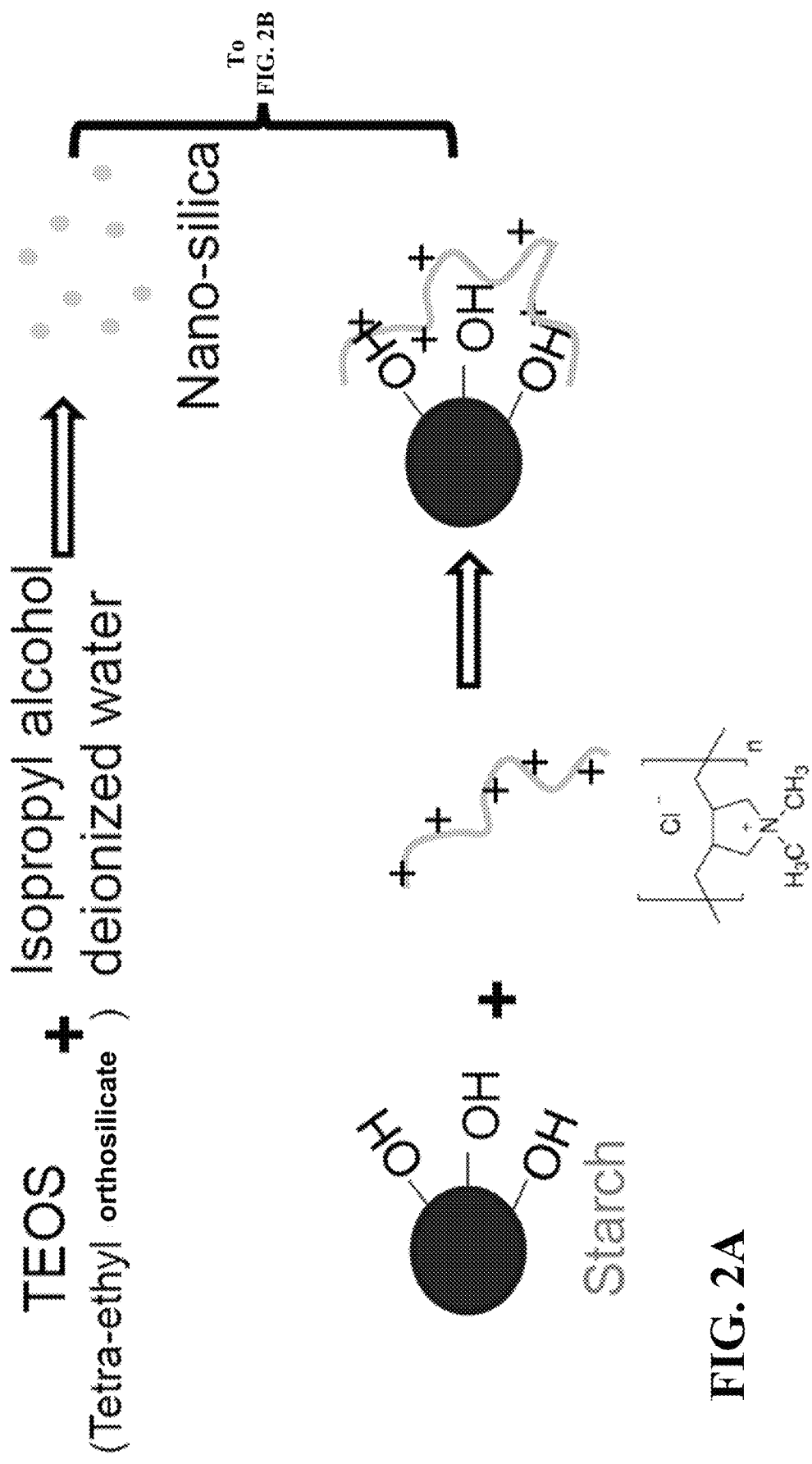
FIG. 2A is a schematic view of a method for manufacturing the modified starch product of FIG. 1, according to another embodiment of the present disclosure.
Figure 2B:
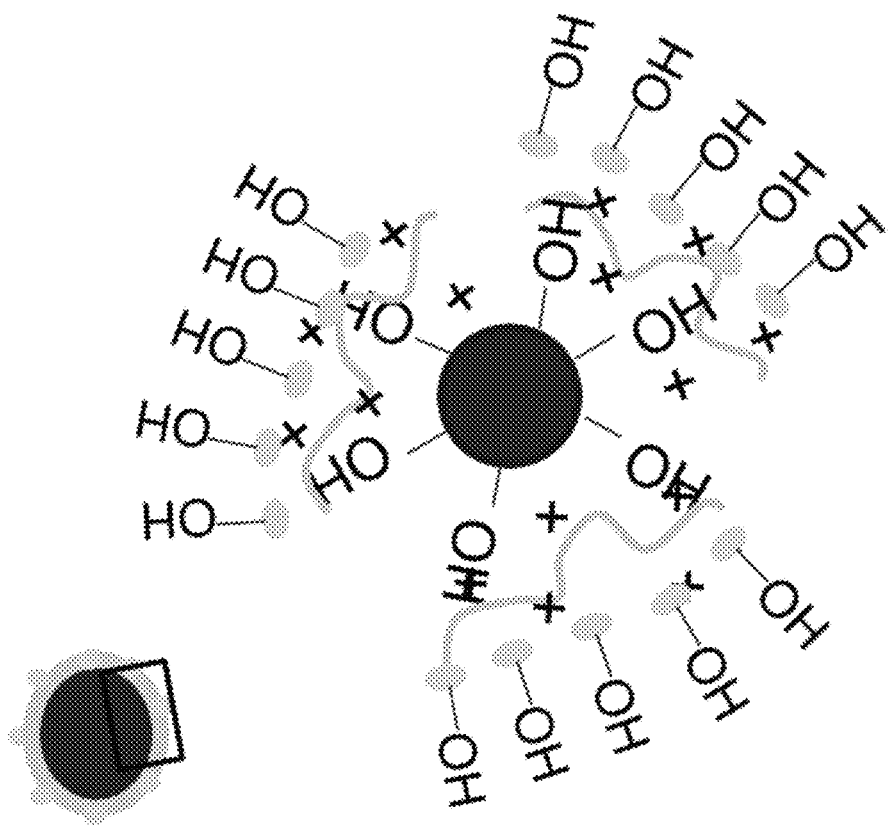
FIG. 2B is a schematic view of the modified starch particle manufactured via the method shown in FIG. 2A.

The present disclosure includes a method of manufacturing the modified starch product, for example, as shown in FIG. 2. A first step in the method can be synthesis of the nano-silica. A silicate can be placed into solution to form the nano-silica. In a more particular embodiment, the silicate can be tetra-ethyl orthosilicate (TEOS). TEOS can be admixed with isopropyl alcohol, deionized water, and ammonium hydroxide, as non-limiting examples, to form a solution of the nano-silica. The solution of nano-silica can be stirred for a predetermined amount of time. For example, the predetermined amount of time can be about eight (8) to about twelve (12) hours. A skilled artisan can select other suitable sources of silica and further materials to form the nano-silica solution, as desired.

A second step in the method can be forming the intermediate polymer coating on the original starch. The original starch can be admixed with a polymer having a high charge density. As a non-limiting example, the polymer can be PDDA. More particularly, the original starch and PDDA can be admixed with NaCl and deionized water to form a suspension of particles of the starch core having the intermediate polymer layer. The suspension of a surface modified starch can be stirred for a predetermined amount of time, for example, thirty (30) minutes. Then, the suspension of a surface modified starch can be centrifuged, and the particles of starch core having the intermediate polymer layer can be harvested.

A third step in the method can be forming the exterior coating of nano-silica on the intermediate polymer coating. The particles including starch cores having the intermediate polymer layer formed thereon from the second step of the method can be admixed with the nano-silica solution formed in the first step. The resultant solution can include of particles of the modified starch product. The solution of particles of the modified starch product can be stirred for a predetermined amount of time, for example, from about eight (8) hours to about twelve (12) hours.

The solution of particles of the modified starch product can be filtered. The modified starch product can be rinsed and dried. The solution for rinsing can include a 1:1 solution of isopropyl alcohol and deionized water. For example, the modified starch product can be dried in an oven at 50° C. for a predetermined about of time to remove the remaining water and solvent.

The present disclosure further includes a rubber composition for a tire component, which includes the modified starch product. More particularly, the modified starch product can be used as a filler in the rubber composition for the tire component. As non-limiting examples, the tire component can be a tire sidewall, a tire tread cap, or a tire base. A skilled artisan can utilize the rubber composition for the tire component in further tire components, as desired.

The rubber composition for the tire component can include a quantity of elastomer and a quantity of the modified starch, including particles with the starch core with the intermediate polymer coating and the exterior coating of a nano-silica, as described hereinabove. The particles can be substantially evenly distributed throughout the elastomer, for example, by a conventional mixing operation.

The modified starch product can be present in the rubber composition in an amount between 0 phr and 20 phr, more particularly between 5 phr and 15 phr, and most particularly 10 phr. Other suitable concentrations of the modified starch product in the rubber composition can also be selected, as desired.

The rubber composition can further include a silane and, more particularly, a polysulfide type silane coupling agent for rubber applications. As one non-limiting example, the silane can be bis-3-triethoxysilylpropyl tetrasulfide (TESPT). The silane can be added to react with the silanol groups of the exterior coating of nano-silica. The silane can be present in the rubber composition in an amount between 0.0 phr and 1.0 phr, more particularly between 0.5 phr and 0.9 phr, and most particularly 0.7 phr. Other suitable concentrations of the silane can also be selected, as desired. One of ordinary skill in the art can select other suitable types of silane coupling agents and concentrations for the same within the scope of the present disclosure.

The rubber composition of the instant disclosure can be compounded by various methods known in the rubber compounding art, such as by mixing the elastomer and the modified starch product with various commonly used additive materials. For example, the additive materials can include curing aids such as sulfur, activators, retarders and accelerators, processing additives such as oils, resins, for example, tackifying resins, plasticizers, non-carbon fillers, pigments, fatty acid, zinc oxide, waxes, antioxidants and antiozonants, peptizing agents, and reinforcing materials. Other suitable additives for rubber compositions can also be used, as desired. Depending on the intended use of the rubber composition, the common additives are selected and used in conventional amounts in the present rubber composition.

The elastomer, the modified starch product, and the additive materials are substantially evenly distributed throughout the rubber composition, for example, by a conventional mixing operation prior to an extrusion or molding operation.

It should be understood that the substantially even distribution of the elastomer and the modified starch product can be facilitated by a thorough mixing operation, and that the ability to perform such mixing operations is possessed by of one of ordinary skill in the art.

The present disclosure also includes an article comprising the rubber composition. It should be appreciated that the rubber composition can be extruded, molded, or otherwise formed into a desired shape and cured through the application of at least one of heat and pressure. In a most particular example, as also described hereinabove, the rubber composition can be used in the tread of the tire.

The following examples are presented for the purposes of illustrating and not limiting the present invention.

EXAMPLES

Example embodiments of the present technology are provided with reference to the several figures enclosed herewith.

The rubber composition of the present disclosure was prepared for testing according to conventional two-pass rubber mixing techniques in a laboratory-sized rubber mixer. The rubber composition was selected to assess the general impact of the modified starch product on the physiochemical properties of the rubber compositions. The formula for the experimental rubber compositions including the modified starch, together with a comparative control including the original starch, are shown below in TABLE 1.

TABLE 1

| Description | Original Starch | Modified Starch |
|---|---|---|
| Rubber | 100 | 100 |
| Carbon Black | 45.00 | 45.00 |
| Original Starch | 10.00 | 0 |
| Modified Starch | 0 | 10.00 |
| Silane | 0 | 0.70 |
| ZnO | 2.60 | 2.60 |
| Stearic Acid | 1.60 | 1.60 |
| Process Acid | 13.60 | 13.60 |
| Antioxidant | 6.00 | 6.00 |
| Curative | 3.60 | 3.60 |
| Total PHR: | 182.40 | 183.1 |

The rubber compositions shown in TABLE 1 were cured using standard vulcanization techniques and tested for various processing and physiochemical properties.

With reference to FIGS. 5-6, the tensile properties of the original starch rubber formulation of TABLE 1 and the modified starch rubber formulation of TABLE 1 were tested and compared. The modified starch rubber formulation shows improved tensile properties compared to the original starch rubber formulation. Accordingly, it is concluded that the modified starch rubber formulation served as a reinforcing filler in compound.

With continued reference to FIG. 6, the modulus was calculated for the original starch rubber formulation and the modified starch rubber formulation at strains of 100%, 200% and 300%. It was found that as the strain increased, the modulus difference between two formulations increased. For example, at the 300% strain, the modified starch compound exhibited 15% higher modulus than the original starch compound, where the two compounds exhibited a similar modulus at the 100% strain. Accordingly, the modified starch rubber formulation exhibited higher modulus than the original starch rubber formulation, which further indicates the reinforcement effect of the modified starch product where used as the filler.

As shown in FIG. 7, the cure curves for each of the original starch rubber formulation and the modified starch rubber formulation were calculated and compared. The original starch rubber formulation and the modified starch rubber formulation exhibited similar cure curves.

With reference to FIG. 8, the fatigue properties for each of the original starch rubber formulation and the modified starch formulation was studied. More particularly, each of the original starch rubber formulation and the modified starch formulation were tested after stored in the ozone condition, which can indirectly reflect the fatigue property of the compound because ozone is known as an important factor for rubber fatigue. Thus, a formulation with higher ozone dynamic load will have a higher anti-fatigue property.

A max load was calculated for each of the original starch rubber formulation and the modified starch formulation after the formulations were exposed to ozone for 0, 24, 48, 72 and 96 hours. It was found that the modified starch formulation had a higher load than original starch formulation. This result can be due to the coupling between surface silanol group and polymer in the modified starch formulation, which can decrease induced potential breakage spots in the rubber. Thus, there is an effective increase in the anti-fatigue property of the rubber.

As shown in FIG. 9, the interaction between each of the original starch rubber formulation and the modified starch formulation and the polymer of each of the rubber formulations was studied. The Payne effect is a common tool to study the interaction between a filler and a polymer. The equation $\Delta G'=\Delta G'\ (0.1\%)-\Delta G'\ (20\%)$ can be used to semi-quantitatively calculate the Payne effect in a same rubber system. It was shown that the modified starch formulation exhibited a lower $\Delta G'$ than the original starch formulation, thus indicating a stronger filler/elastomer interaction in the modified starch formulation.

With reference to FIG. 10, a tear adhesion test for each of the original starch rubber formulation and the modified starch formulation was performed. The modified starch formulation exhibited a higher tear adhesion than that of the original starch formulation. It is believed that the improvement of tear adhesion can be related to the energy dissipation in the intermediate polymer coating. Due to the viscoelasticity of the intermediate polymer, the intermediate polymer can serve as a damping layer between the modified starch product and the elastomer of the rubber composition.

Advantageously, the modified starch product is hydrophobic in presence of silane coupling agent and can therefore be utilized as a reinforcing filler in rubber compositions. Further, the modified starch product can provide improved performance in the rubber compositions, particularly where compared to an unmodified starch.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments can be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A modified starch product, comprising:
a plurality of particles, each particle including a starch core, an intermediate polymer coating, and an exterior coating including a nano-silica, the intermediate polymer coating being selected to have a charge density that allows for the intermediate polymer to concurrently interact with hydroxyl groups of the starch core and the nano-silica of the exterior coating.

2. The modified starch product of claim 1, wherein each particle has a particle size between about 1 micron and about 10 microns.

3. The modified starch product of claim 1, wherein each particle has a particle size between about 2 microns and about 8 microns.

4. The modified starch product of claim 1, wherein each particle has a particle size between about 3 microns and about 7 microns.

5. The modified starch product of claim 1, wherein the modified starch product is manufactured by admixing an original starch and a silica.

6. The modified starch product of claim 5, wherein the nano-silica is formed from tetra-ethyl orthosilicate.

7. The modified starch product of claim 1, wherein the intermediate polymer coating includes poly(diallyldimethylammonium chloride).

8. The modified starch of claim 1, wherein the starch core includes a member selected from a group consisting of rice starch, corn starch, potato starch, wheat starch, and combinations thereof.

9. A rubber formulation, comprising:
a quantity of elastomer; and
a quantity of modified starch particles, each particle including a starch core, an intermediate polymer coating, and an exterior coating including a nano-silica, wherein the modified starch particles are substantially evenly distributed throughout the elastomer.

10. The rubber formulation of claim 9, further comprising a silane.

11. The rubber formulation of claim 10, wherein the silane includes a polysulfide silane coupling agent.

12. The rubber formulation of claim 10, wherein the silane includes bis-3 triethoxysilylpropyl tetrasulfide.

13. An article comprising the rubber formulation of claim 9.

14. A tire comprising a tire sidewall with the rubber formulation of claim 9.

* * * * *